United States Patent
Beal et al.

[11] Patent Number: 5,872,956
[45] Date of Patent: Feb. 16, 1999

[54] DESIGN METHODOLOGY FOR DEVICE DRIVERS SUPPORTING VARIOUS OPERATING SYSTEMS NETWORK PROTOCOLS AND ADAPTER HARDWARE

[75] Inventors: Peter Daniel Beal; James Steele Gaillard, both of Apex; Steven Howard Johnson; Gregory Francis Paussa, both of Cary; Alejandro Emilio Vasquez, Raleigh, all of N.C.

[73] Assignee: International Business Machines Corporation, Armonk, N.Y.

[21] Appl. No.: 842,347

[22] Filed: Apr. 24, 1997

[51] Int. Cl.$^6$ .................................... G06F 15/177
[52] U.S. Cl. ............................................ 395/500
[58] Field of Search ......................... 395/500, 701

[56] References Cited

U.S. PATENT DOCUMENTS

| | | | |
|---|---|---|---|
| 5,267,246 | 11/1993 | Huang et al. | 371/165 |
| 5,274,637 | 12/1993 | Sakamura et al. | 370/85.5 |
| 5,301,303 | 4/1994 | Abraham et al. | 395/500 |
| 5,319,751 | 6/1994 | Garney | 711/115 |
| 5,363,366 | 11/1994 | Wisdom, Jr. et al. | 370/13 |
| 5,379,296 | 1/1995 | Johnson et al. | 370/60 |
| 5,404,494 | 4/1995 | Grney | 395/500 |
| 5,548,731 | 8/1996 | Chang et al. | 395/280 |
| 5,586,268 | 12/1996 | Chen et al. | 395/858 |
| 5,727,212 | 4/1995 | Dianallo | 395/681 |
| 5,781,798 | 12/1993 | Beatty et al. | 395/830 |

*Primary Examiner*—Kevin J. Teska
*Assistant Examiner*—Aynt Mohamed
*Attorney, Agent, or Firm*—Joscelyn G. Cockburn

[57] ABSTRACT

An alterable device driver development system for supporting various operating systems, network protocols, and adapter hardware interfaces. Each device driver comprises a System, Network and Adapter software component, each component providing services to the other through its associated programming interfaces and being alterable or replaceable according to the requirements of an associated adapter hardware product. The System component supports a set of services defined by the device driver and which can be used by the Network and Adapter components. The Network component manages all interactions of the Adapter component with a network operating system or protocol stack and ensures its applicability and correctness in the context of the device driver operation. The Adapter component provides the functions for operating and managing all interactions with the adapter hardware. A Transformation Path in the Adapter component improves device driver performance by mapping network packet descriptors against adapter packet descriptors in data transferring processes.

11 Claims, 9 Drawing Sheets

Typical Network Component Primitive Definition

NetCommandComplete

SUMMARY
    Signals the completion of a previously queued *AdpCommand* request.

DECLARATION
    NetRC  NetCommandComplete ( pContext  pCtx,
                                Correlator    NetCorrelator,
                                AdpRC         FinalCompletionStatus );
INPUTS
    pCtx -- Pointer to a specific adapter context.

NetCorrelator -- A value used by the Adapter component to identify the
    command that has been completed. This value was originally provided by the
    Network component to the Adapter component in the *AdpCommand* primitive.

FinalCompletionStatus -- Indicates the result of the command processing.

OUTPUTS
    Return Value:
        NET_SUCCESS
        NET_BAD_CORRELATOR

DESCRIPTION
    This function is called by the Adapter component when a previously issued
    *AdpCommand* that was returned with ADP_QUEUED has completed. The
    FinalCompletionStatus parameter contains
    the end result of the command operation.

CALLED BY
    ADP

FIG. 2A

*Some Typical Network Component Return Code Definitions*

| NetRC Return Value | DESCRIPTION |
| --- | --- |
| NET_SUCCESS | The operation completed without error or exception. |
| NET_FUNCTION_FAILED | The desired operation terminated abnormally. This return value is used when none of the others defined for the primitive can satisfactorily describe the problem encountered. |
| NET_BAD_PARAMETER | One or more of the parameters defined for the primitive was invalid or incorrect. This includes not only formal arguments passed in the function call itself, but also the contents of any public or global data used by the function. |
| NET_BAD_CORRELATOR | A correlator value passed from the Adapter component to the Network component does not identify an appropriate Network component resource for the activity being performed. |

FIG. 2B

Some Typical Network Component Global Data Requirements

Universal (Non-Context) Data (NONE CURRENTLY DEFINED)

Context Data

| TYPE | VARIABLE NAME | DESCRIPTION |
| --- | --- | --- |
| ulong | Capabilities | Bit field indicating the Network component's functional capabilities. |
| ulong | Needs | Bit field indicating specific needs of the Network component that must be provided by the other components. |
| Negotiable Parameters | | |
| ushort | ReceiveBufferCount | Number of individual receive buffers configured for this adapter. |
| ushort | ReceiverBufferSize | Number of bytes in each individual receive buffer. |
| ushort | MaxActiveTransmits | The largest number of command requests that can be outstanding (in-progress) at any one time. |
| ushort | MaxActiveRequests | Total number of multicast addresses that can be set for the adapter. |
| ushort | MaxNumMcastAddrs | The largest supported frame size for both transmits and receives. Set to the least common value of what the Adapter component can support and any user-specified configuration parameter. |
| ushort | MaxFrameSize | This parameter may also be modified during adapter hardware initialization as well. |

FIG. 2C

Typical System Component Primitive Definition

SysPortReadDWord

SUMMARY
  Reads a 32-bit double word from the specified I/O port.

DECLARATION
  void    SysPortReadDWord  ( pContext    pCtx,
                              ulong       IOPort,
                              p32UlongDestination );

INPUT
  pCtx -- Pointer to a specific adapter context.

IOPort -- The I/O address of the port to be read.

Destination -- Pointer to a unsigned long location.

OUTPUT
  The Destination location is updated with the doubleword value read.

DESCRIPTION
  Reads one doubleword from the I/O port location specified by IOPort and stores it in the location specified by Destination.

CALLED BY
  ADP

FIG. 3

*Typical Adapter Component Primitive Definition*

AdpReceiveDisable

SUMMARY
  Prevents the presentation of received frames from the attached network.

DECLARATION
  AdpRC  AdpReceiveDisable ( pContext  pCtx );

INPUTS
  pCtx -- Pointer to a specific adapter context.

OUTPUTS
  Return Value:
    ADP_SUCCESS

DESCRIPTION
  Called by the Network component to prohibit the Adapter component from presenting any frames received from the network. While in this state, all frames received by the adapter must be thrown away and do not cause any type of notification to the Network component nor any associated counters to be incremented.

The value specified in the Network component's ReceiveMask data field is no longer considered valid until a subsequent AdpReceiveEnable is invoked. This allows the Network component to leave the receive mask value intact (rather than having to zero it out) and reuse it when frame reception is later re-enabled.

Note: This primitive is typically called when a protocol stack issues a packet filter setting of zero, or something similar.

CALLED BY
  NET

FIG. 4

DESIGN METHODOLOGY FOR DEVICE DRIVERS SUPPORTING VARIOUS OPERATING SYSTEMS NETWORK PROTOCOLS AND ADAPTER HARDWARE

BACKGROUND OF THE INVENTION

1. Field of the Invention

This invention relates to data processing systems and to improvements in device driver design methodology. More particularly, the invention relates to device drivers supporting a wide variety of operating systems, network protocols and adapter hardware.

2. Description of the Prior Art

The development of various types of Local Area Networks (LAN) and Wide Area Networks (WAN) adapters for data processing systems presents a challenge from both the hardware and software perspective. Designing and building the adapter card itself is a sizable task, and is one that is usually the most familiar. The requisite support software, on the other hand, is less understood and can easily be underestimated (or overlooked) when budgeting time or resources for a project. This is especially true in the area of device drivers, which are critical elements to the success of an overall adapter project, and whose development is the subject of this invention.

Contributing to the problem of adapter device driver development is the fact that there are an abundance of interface categories, such as system platform, bus types, adapter hardware, network protocols, etc., each of which affects the design of a device driver. This is not a new problem, however, and attempts have been made to reduce complexity by defining types of common interfaces at the network-data-link layer. Both Open-Data Link Interface (ODI) from Novell Corporation and the Network Driver Interface Specification (NDIS) from 3Com and Microsoft Corporations, define well-known (although different), defacto standardized programming interfaces which serve to isolate an adapter Media Access Control (MAC) driver from the network protocol software that runs in the layer(s) above it. The advantage of this is apparent when a new hardware adapter product is introduced to the marketplace which, when supplied with the proper ODI and/or NDIS compliant device drivers, will usually work in those existing environments respectively.

Attempting to standardize the network interface is a step in the right direction, but is not enough from an overall adapter development perspective. Often, support for both the ODI and NDIS network interface is required along with others. To develop a sufficient set of device drivers for the product, one needs to also consider several other interface categories, such as those mentioned previously. Taking into account that each of these categories can have multiple types, the number of possible combinations grows exponentially, making it difficult to manage the development of a full set of device drivers. Also, since each device driver serves a unique purpose and is often developed by a different person(s) with a particular area of expertise, code duplication can be excessive when viewed across all of the drivers, and similar functions run the risk of being implemented differently.

In simplest terms, the problem addressed by the invention is the current inability to mass produce a full set of required device drivers in time for initial delivery of an adapter product. Due to the rapidity of product introduction, the incessant technological changes that accompany them, and the industry-wide trend toward overall work force reduction, it is no longer feasible to custom-build each individual device driver with only a minimal amount of design and code sharing if any. The ultimate goal is to have a process that can best be described as "push button" device driver development, wherein the developer selects the key components of the device driver and it is automatically built.

A solution to the stated problem is to re-architect device drivers into three main software components: System, Network and Adapter. The three component device driver model offers the necessary and sufficient degree of interaction and dependence to support operating systems, network protocols and adapter hardware interfaces, respectively, while simultaneously minimizing redundant designs and implementation of LAN/WAN device drivers. When fully implemented in a three component device driver, a developer can select one of each component to build the desired device driver, producing in a single driver, an executable file as a result.

As new adapter products emerge, only a new Adapter component needs to be developed at a fraction of the current development time, and it can be combined in various combinations of System and Network components to create a full set of unique device driver executable files, which can be used to support the product in different operating environments. Similarly, support for new operating systems and/or network protocol interfaces can be added by creating new System and/or Network component implementations resulting in support for a full range of adapter products through their existing Adapter components. Thus, a wide range of device driver executable files can be easily created simply by choosing different combinations of a System, Network, and an Adapter component from the available set of component implementations.

From an architectural perspective, a device driver model consisting of three primary components is deemed to be optimal. Fewer components typically result in increased code duplication among different device drivers as well as an excessive reliance upon multiple levels of conditionally-included code, both of which lead to problems with maintaining and supporting the device drivers. A model based on more than three primary components becomes needlessly complex and increases the driver inter-component communications, resulting in less desirable operating performance characteristics. Though some operating environments tend to blur the distinction between the System and Network components from an implementation perspective, these remain distinct entities architecturally and have clearly defined responsibilities, which is the premise of this invention.

The prior art related to the present invention is as follows:

U.S. Pat. No. 4,649,479 to H. Advani et al., issued Mar. 10, 1987, describes a device driver and adapter binding technique in which an operating system having device drivers is run as a virtual machine on a virtual resource manager having device drivers of real and virtual devices. A device dependent information file corresponding to a device is created. This file contains adapter dependent information including a hardware port address for the physical device. A "token" is in the operating system device driver at the time it is initiated. When the operating system device driver is "open" to drive the device, it uses the "token" to communicate with the virtual resource manager device driver thereby accomplishing the driver-to-driver binding. This causes the virtual resource manager device driver to use the adapter-dependent information in a special file corresponding to the "token" and placed in the process stack.

U.S. Pat. No. 5,265,252 to F. Rawson, III, issued Nov. 23, 1993, discloses a generic device driver core having a generic operating system interface generic to a plurality of different operating systems including an install operating system. The core is portable between different operating systems and has a plurality of specific device drivers connected to I/O devices for controlling operation of the I/O devices. A conversion means functionally layered between the specific device driver interface of the installed operating system and the generic operating system interface of the device driver converts I/O requests and responses between the specific device driver and operating system and the generic operating system interface of the device driver core to thereby adapt the generic device driver core to operate specifically with the installed operating system.

U.S. Pat. No. 5,379,296 to R. A. Johnson et al., issued Jan. 3, 1995, discloses an interface which enables a "LAN" connected work station to concurrently communicate with a plurality of computer platforms having respective network architecture over the same physical connection. The interface receives data from a LAN connection, examines the data and identifies the format being used. Based on the identified format, the interface determines the appropriate destination for the data and sends the data to that destination.

U.S. Pat. No. 5,586,268 to K. C. Chen et al., issued Dec. 17, 1996, and filed Mar. 3, 1995, discloses a device driver to control multiple peripheral devices in a computer system. First and second interface buses permit interconnection of peripheral adapters with a central processor. The interface buses each correspond to different classes of peripheral adapters. The device driver includes an initialization routine for scanning the interface buses to identify predetermined functionally-related peripheral adapters. A communication path is provided between the operating system and each of the peripheral adapters of a form appropriate for the particular interface bus connected to each adapter. A control path is also provided between each of the peripheral adapters and the operating system of a form appropriate for the particular interface bus connected to each adapter. The core device driver provides for the common control and management of the communication and control paths between the operating system and each of the peripheral adapters.

None of the prior art discloses a device driver architecture which has three main components and which enables a developer to select components to support a wide variety of operating systems and platforms; network protocols and adapter hardware.

SUMMARY OF THE INVENTION

An object of the invention is a design methodology to enable a developer to efficiently construct a plurality of device drivers for data processing systems whereby the drivers can support a wide variety of operating systems; network protocols and adapter hardware.

Another object is a device driver model architecture comprising multiple components which may be altered or replaced as required in a data processing system to support a wide variety of system platforms and operating systems; network protocols and adapter hardware.

Another object is a multiple component device driver model architecture including a performance enhancement path which allows direct mapping between a network protocol stack of packet descriptors and hardware packet descriptors for critical receive and transmit operations within an adapter component.

Another object is a method of supporting various types of adapters for LAN and WAN networks across various operating systems, network protocol and hardware interfaces, while minimizing redundant design and implementation of LAN/WAN device drivers.

These and other objects, features and advantages are achieved in a data processing system including LANs and/or WANs in which a device driver design methodology uses at least three main components to enable a developer to select and combine key components to support a wide variety of operating systems and platforms, network protocols and adapter hardware. Each device driver is comprised of a System, Network and Adapter software component. Each component provides services to the other through an associated programming interface and is alterable or replaceable according to the requirements of the operating system or platform, network protocol or adapter hardware. The System component supports the services defined by the device driver and operating system which can be used by the Network and Adapter component. The Network component manages all interactions of the Adapter component with network operating systems and insures its applicability and correctness in the context of the device driver operation. The Adapter component provides the function for operating and managing all interactions with the adapter hardware. A Transformation Path in the Adapter component improves the translation of network protocol stack descriptors against adapter packet descriptors in data transferring processes.

DESCRIPTION OF DRAWINGS

The invention will be more fully understood from the following detailed description of a preferred embodiment, taken in conjunction with appended drawing in which:

FIG. 2A is a representation of a single network component primitive in literal form for the device driver of FIG. 1.

FIG. 2B is a partial Table of network component return code definitions for the Network component of FIG. 2A in responding to other component primitives.

FIG. 2C is a partial Table of Network component data definitions, fixed or negotiable, for the Network component of FIG. 2A.

FIG. 3 is a representation of a single System component primitive for the device driver of FIG. 1.

FIG. 4 is a representation of a single Adapter component primitive for the device driver of FIG. 1.

DESCRIPTION OF PREFERRED EMBODIMENT

Figure 1:
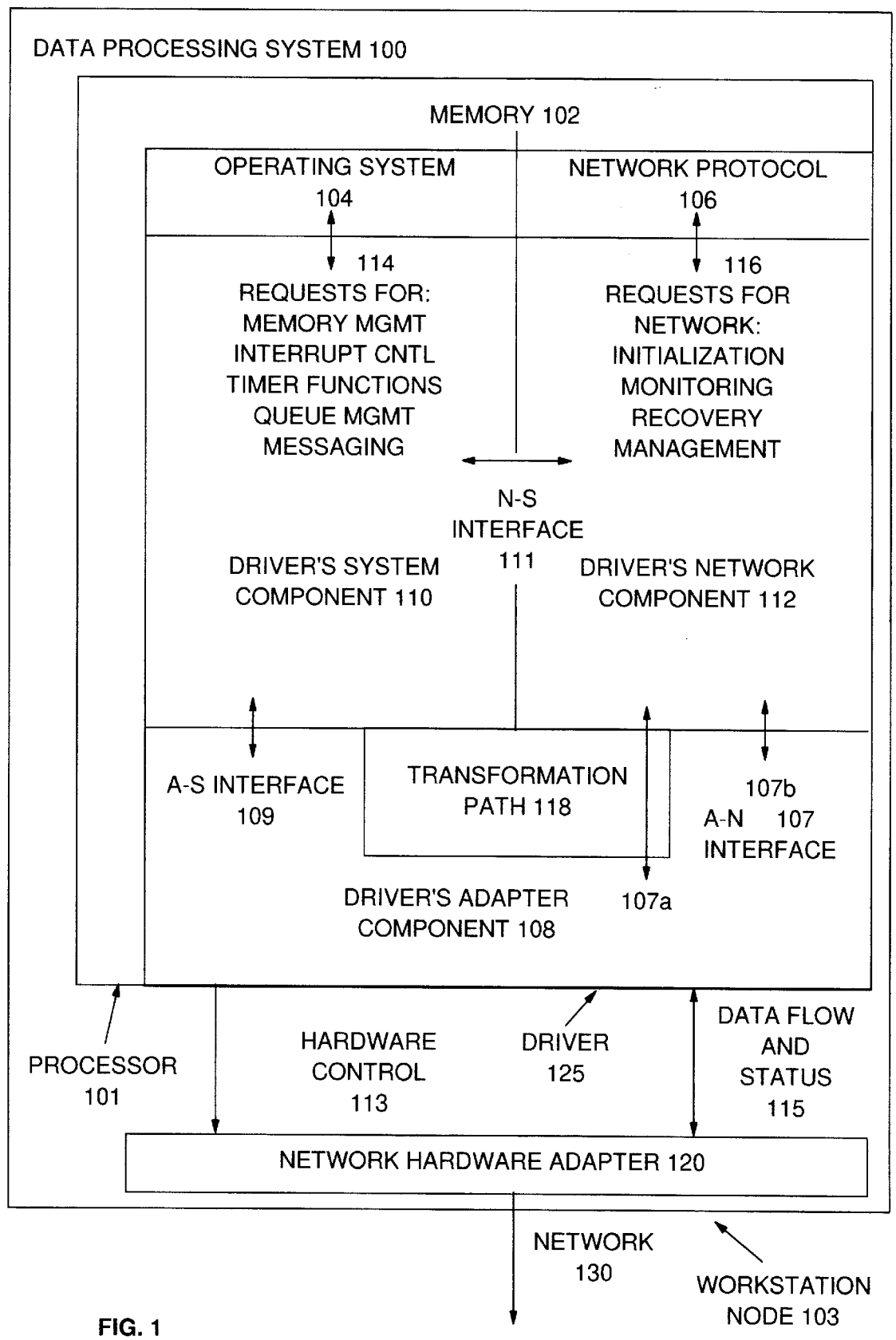
FIG. 1 is a block diagram of a device driver incorporating the principles of the present invention.

In FIG. 1 a data processing system 100 includes a processor 101 and a memory 102 coupled to a work station 103 including a network hardware adapter 120. A network, e.g., LAN/WAN 130 is coupled to the adapter.

Within the memory 102 an operating system 104, e.g., IBM Operating System OS/2 or the like, and a network protocol, e.g., Novell ODI 106, communicate with a device driver 125. Included in the device driver is an Adapter component 108, a System component 110, and a Network component 112. Each component communicates with the other components in the device driver through a defined interface. The Adapter and Network components communicate through a defined interface 107. The Adapter and System components communicate through a defined interface 109. The Network and the System components communicate through a defined interface 111. The control signals for the adapter hardware 120 are supplied from the device driver through a line 113. Data flow and status signals between the network 130 and device driver are provided by a line 115 to the adapter hardware 120.

The Adapter component 108 manages all interactions with the LAN/WAN adapter hardware and shields this action from the other components in the model driver. Quite often this is the most specialized of the three components, since it must deal with the intricacies of the adapter hardware, and assumes a certain amount of trust in the System and Network components 110 and 112, respectively, with regards to their interaction. The Adapter component provides the necessary function for setting up the adapter hardware, controlling and reporting adapter hardware operations, sending and receiving packets on the network 130, interrogating the adapter hardware 120 to determine what interrupt servicing is needed, and handling any specific logic sequences that the adapter hardware requires. The Adapter component ultimately identifies which hardware adapter exists in the system and which are to be controlled by the device driver. (The System component 110 may have provided a coalesced set of machine configuration data beforehand.)

The practicality of the Adapter component from a device driver development standpoint is quite apparent. The component reduces the development effort for new adapter products by allowing the device driver writer to focus upon the unique aspects of the new adapter hardware instead of design considerations concerning system and network protocol environment issues. Thus, given an existing set of System and Network component implementations, by creating only a new Adapter component implementation, all the required device drivers can be built for adapter hardware products with little additional development costs, if any. Another important attribute of an independent Adapter component is that it facilitates a common method of interacting with the adapter hardware among different device drivers. This helps to ensure driver design integrity and stability for the driver developers since the adapter hardware is operated in a predictable fashion. The Adapter component also isolates the portion of the device driver code that is affected by any adapter hardware abnormalities or anomalies, such that they can be addressed in one place and incorporated automatically in all device drivers using that same Adapter component implementation.

The System component 110 is responsible for presenting a standard and consistent view of both the operating system and the system hardware (machine) platform in which the device driver is executing. The System component allows the Adapter and Network components to be implemented independent of any particular operating environment and enables their reuse across a wide variety of systems without additional modifications. In order to achieve this system environment independence, the System component 110 must hide away, or abstract, the details of interacting with a particular system by supporting a set of services defined by the device driver model which can be used by the Network and Adapter component.

Typical services provided by the System component can be classified as, but not necessarily limited to, the following:

Memory Management

Hardware Interrupt Control, including re-entrancy protection

Timer facilities

Generic Queue Management

Input/Output (I/O)—both port I/O and memory mapped I/O

Common Debug Tracing

Messaging

While additional services can be defined for a particular model architecture, an inventive feature is that the System component provides services which are essential to the operation of the device driver, as well as ones that are a convenience for all components to be used at what otherwise would need to be duplicated within each (tracing and messaging, for example). The System component also defines the concept of an adapter entity, and allocates the related vital storage data or context for each adapter controlled by the device driver.

In many environments, a single device driver is used to control one or more adapters of a similar type. In the definition of this device driver, the System component has the responsibility for coordinating the interrupt management among all such adapters controlled by the device driver. The System component must also honor the hardware interrupt servicing requirements imposed by a particular system machine design, and sequence that with the device driver interrupt activities.

One area for which the System component is not responsible in the definition of the device driver is to provide a degree of independence from different system processors (central processing unit, or CPU) types. To do so would require that any non-portable operation performed by any component would have to be directed through the System component in some fashion (direct calls or code macros), which would lead to a cumbersome and possible inefficient design. Instead, the device driver model and device driver design leaves this up to the implementation to resolve, which can be done using a high level, portable programming language such as C.

The Network component 112 interacts with the Network Operating System (NOS) or protocol stack. Each Network component implementation is defined to support a particular protocol stack interface, such as Novell ODI, NDIS 2.0, NDIS 3.x, SCO MDI, etc. These network interfaces typically define a means for sending and receiving packets (frames) on the attached LAN/WAN network 130. The interfaces initialize, monitor and maintain overall network related operations and control the usage of the underlying adapter hardware. The Network component manages the support of these required network interface functions and ensures their applicability and correctness in the context of the device driver operation.

The Network component accomplishes this by using System component services as needed, and through interaction with the Adapter component for accessing the adapter hardware. Functions of the Network component as defined by the device driver, includes parsing each adapter's network configuration information and reporting adapter errors to the protocol stack(s) through their defined status event notification mechanisms and/or error logging. The Network component is also responsible for handling any adapter "registration" action required by its network support environment.

An additional Network component responsibility is the coordination of operating parameters that are negotiated between itself and the Adapter component based on their respective capabilities. Examples of such parameters are the number and size of receive buffers, the maximum packet size allowed on the attached LAN/WAN, the maximum number of queued requests that can be outstanding at any one time, etc. This ability to negotiate between the Network and Adapter components is of paramount importance in supporting a wide variety of adapter hardware types in an independent fashion.

The internal Application Programming Interfaces (API) 107, 109, and 111, define a set of services that each component is obligated to provide the other component in the model. Support for the API services is in the form of primitives, defined by the device driver as a requirement for all component implementations, although there is a provision for Adapter components to explicitly state their ability to support certain API primitives in instances where Adapter hardware differences typically arise. Each API primitive is defined by a code calling convention, including input/output values and by any public data (to be described hereinafter) required or affected. The API primitive also provides a description of the action(s) performed. Some API primitives are defined to be completed synchronously, while others may be performed asynchronously, in which case a corresponding completion primitive is defined.

Turning to FIG. 2A, a representative primitive is shown for the Network component. The primitive defines the inputs to and output from the component in performing a "Net-CommandComplete". The declaration is stated in a programming language, e.g. C, to enable the command to be completed regardless of the driver operating system or adapter hardware.

FIG. 2B describes examples of some return codes that the Network component provides to the other components in response to calls by the other components.

Public data is defined as information considered vital to the operation of the device driver. The data is public in the sense that each component can reference this data, although the device driver model architecture states any restrictions on which component "owns" specific portions of public data and therefore has an exclusive right to update its contents. It is important to understand that public data should not necessarily be confused with what is commonly referred to as "global" data, wherein there is a single defined storage location for each such piece of data shared throughout the entire device driver. While public data is global in the sense that it is not automatic (i.e., stack-based) data, public data is defined by the model in terms of two categories: Universal (non-adapter-specific) data and context (adapter-specific) data.

Universal data is not associated with any one adapter, and contains information that is relevant to the device driver as a whole. Examples of universal data are system machine attributes, such as CPU type and speed, a set of pointers to the individual adapter context, and a consolidation of the machine hardware's configuration information. In contrast, the context data is used to control device driver operations on a per-adapter basis, and allows a single device driver to control multiple adapters. Context data also contains all the appropriate adapter information, such as operating state, specific configuration parameters, statistical data, functional capabilities and so forth. All three components are aware, by design, of both the universal data and the adapter context data, which is factored in to their API definitions, as needed.

FIG. 2C discloses examples of context data for the Network component. The data is defined by Type, Variable name and Description. The Type field is the physical form of the data expressed in a programming language. The Variable Name is used in conjunction with the Type for referencing the field described in the table. The context data for "Capabilities" and "Needs" is under the control of the Network component as non-negotiable data and must not be altered by the other components. The remaining data is negotiable by the Network component with respect to the other components. When the negotiable data is offered the other components may change the data in a prescribed manner according to their needs.

Turning to FIG. 3 an example of a primitive is defined for the System component to perform the operation "SysPortReadDWord". The input and output for the primitive are defined for the operation. The declaration provides the programming language for executing the operation in the other components. Associated with the system primitive are return codes and data, not shown for purposes of brevity in describing the invention. The return codes and data would be similar in form to the return code and data described for the Network component.

Turning to FIG. 4 an example of a primitive is defined for the Adapter component to perform the operation "AdpReceiveDisable". The input and output for the primitive are defined for the operation. The declaration provides the programming language for executing the operation in the other components. Associated with the system primitive are return codes and data, not shown for purposes of brevity in describing the invention. The return codes and data would be similar in form to the return code and data described for the Network component.

Returning to FIG. 1, a Transformation Path 118 located in the Adapter component 108 couples it to the Network component 112 and may use some services of the System component 110. The three component device driver 125 does not require a Transformation Path to be viable. The Transformation Path adds a unique characteristic to the device driver in terms of improving performance. In general, device drivers are very sensitive to the issue of performance, usually the faster, the better. This is especially true for mainline activities of receiving and transmitting packets on the attached network 130. The performance sensitivity is what, in many cases, precludes the use of purely abstracted object-oriented driver implementations when developing device driver software.

A three component device driver design where each component is strictly isolated from the other, providing controlled access through its API and associated public data only, will operate correctly. In order to provide total isolation, anything that differs in format or function among various implementations of a given component type (such as the Network component) needs to be converted to an abstract form for use within the model by the other components. In this way, the other components are not tied to these format and function variations and can be developed independently. The process of converting to an abstract internal model format comes at a cost to the device driver both in terms of reduced performance and increased system memory usage. In many cases, the cost is an acceptable tradeoff for the gain in the design development process. For high-impact tasks of packet reception and transmission, where a LAN/WAN device driver spends a vast majority of its execution time, the additional cost of pure component isolation may not be acceptable, so an alternative is desired.

The Transformation Path 118 added to the present design has a feature to address performance costs. In its architectural sense, the Transformation Path is a specialized part of the Adapter software component that has detailed knowledge of a Network component's transmit and receive packet descriptor format as specified by its network protocol stack. Each network interface defines a data structure to be used for building a packet to be transmitted onto the LAN/WAN and another data structure for describing a packet received from the LAN/WAN. These packet data structures, commonly referred to in the industry as descriptors or fragment lists, are formatted differently among the different network interfaces. Likewise, each type of adapter hardware defines what it needs to know about packets in order to transmit and receive them on the attached physical network. Thus, the various Network component packet descriptor formats need to be mapped to a particular hardware packet descriptor format and vice versa. The role of the Transformation Path, therefore, is to perform this descriptor mapping within the Adapter component in a Network component-specific fashion. Doing so saves the costly overhead of using an intermediate generic descriptor format to convert between the different packet descriptor types for transmission and reception operations.

To make this work, the Transformation Path needs detailed knowledge of something that is considered to be exclusively within the domain of the Network component, namely the formats of its protocol stack receive and transmit packet descriptors. By exposing this knowledge to the Adapter component, performance is improved over that of a model adhering to strict component isolation. While a basis of this disclosure is to rearchitect device drivers to promote reuse through specific component identity, the Transformation Path provides a controlled means of handling this exception while preserving a vital driver performance characteristic. The key attributes of a Transformation Path are:

A limited role (packet descriptor mapping).

Architectural identity (part of Adapter component).

Localized function (transmit and receive operations only).

High benefit vs. cost ratio (performance gain vs. increased complexity and reduced purity of a design).

It is important to understand that the Transformation Path is defined by the device driver model architecture as a specialized part of the Adapter component's transmit and receive path whose purpose is to supply the mapping between the different Network component protocol packet descriptors and the packet descriptor format required by the adapter hardware.

Figure 5:
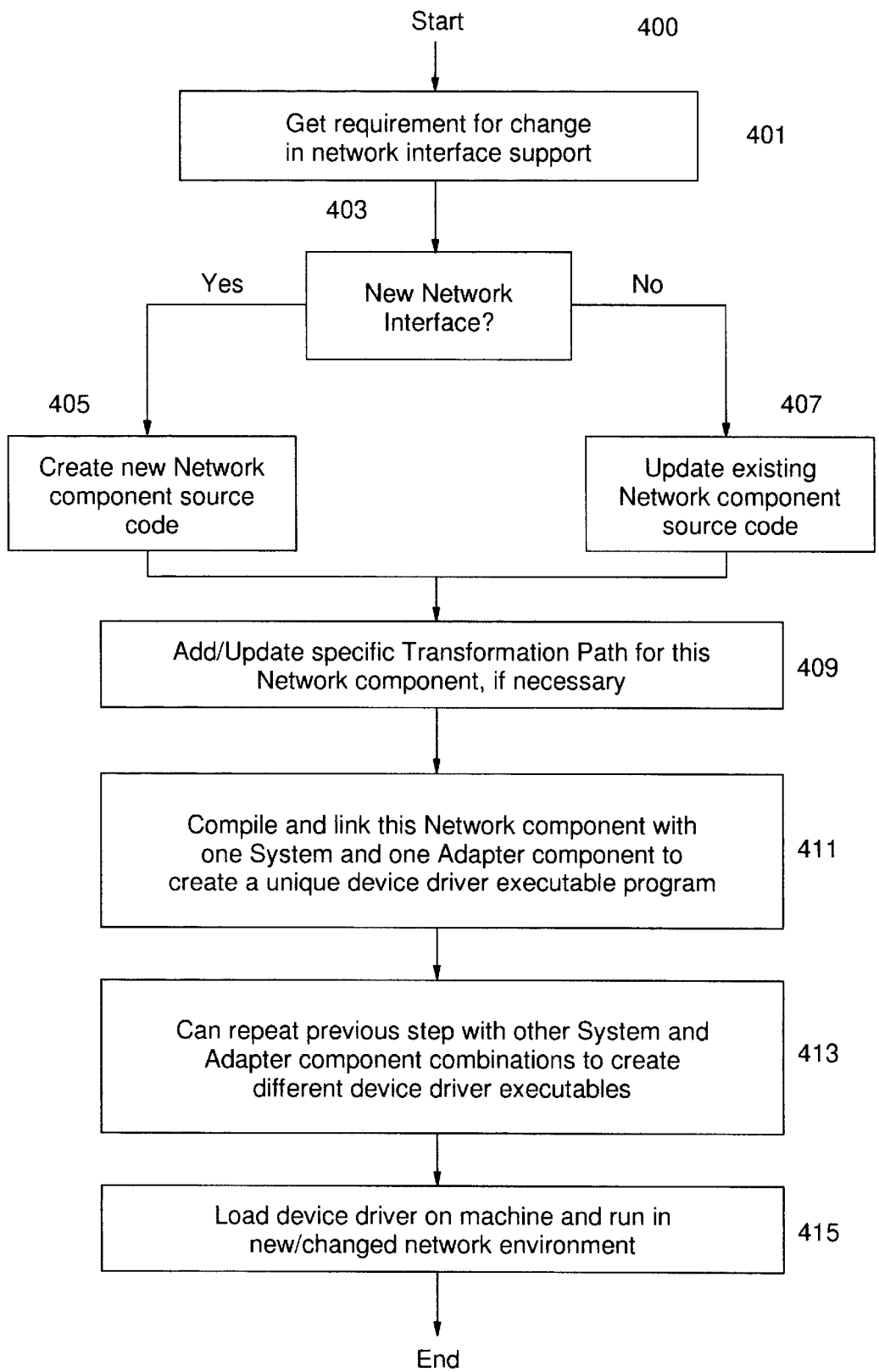
FIG. 5 is a flow diagram for modifying a Network component in the device driver of FIG. 1 to handle a network interface change.

Turning to FIG. 5, a design process 400 is disclosed for changing a network interface to support a new or revised network protocol begins in a step 401 in which a designer receives the requirements for supporting a new or revised network protocol. A step 403 determines if the network protocol is new. A "yes" condition initiates a step 405 in which the designer creates a new Network component source code. A "no" condition initiates a step 407 in which the designer updates the existing Network source code to conform to specifications. In the case of step 405 the designer creates the files, data structures and code, as required, for adapting the new network protocol to the primitives provided by the Network component to the other components. In the case of step 407, the designer modifies the files, data structures and code, as required, to achieve conformity, improvement or correction in operation provided by the network component to the other components. In response to steps 405 or 407, a step 409 adds or updates a specific Transformation Path for the Network component, new or existing, if necessary. A step 411 compiles and links the modified Network component with one System and one Adapter component to create a unique device driver executable program. Step 411 is repeated in a step 413 to create different device driver executables for other System and Adapter component combinations with this Network component. A step 415 loads new or revised device driver over onto the processor to run in the new or changed network interface environment, after which the design process ends.

Figure 6:
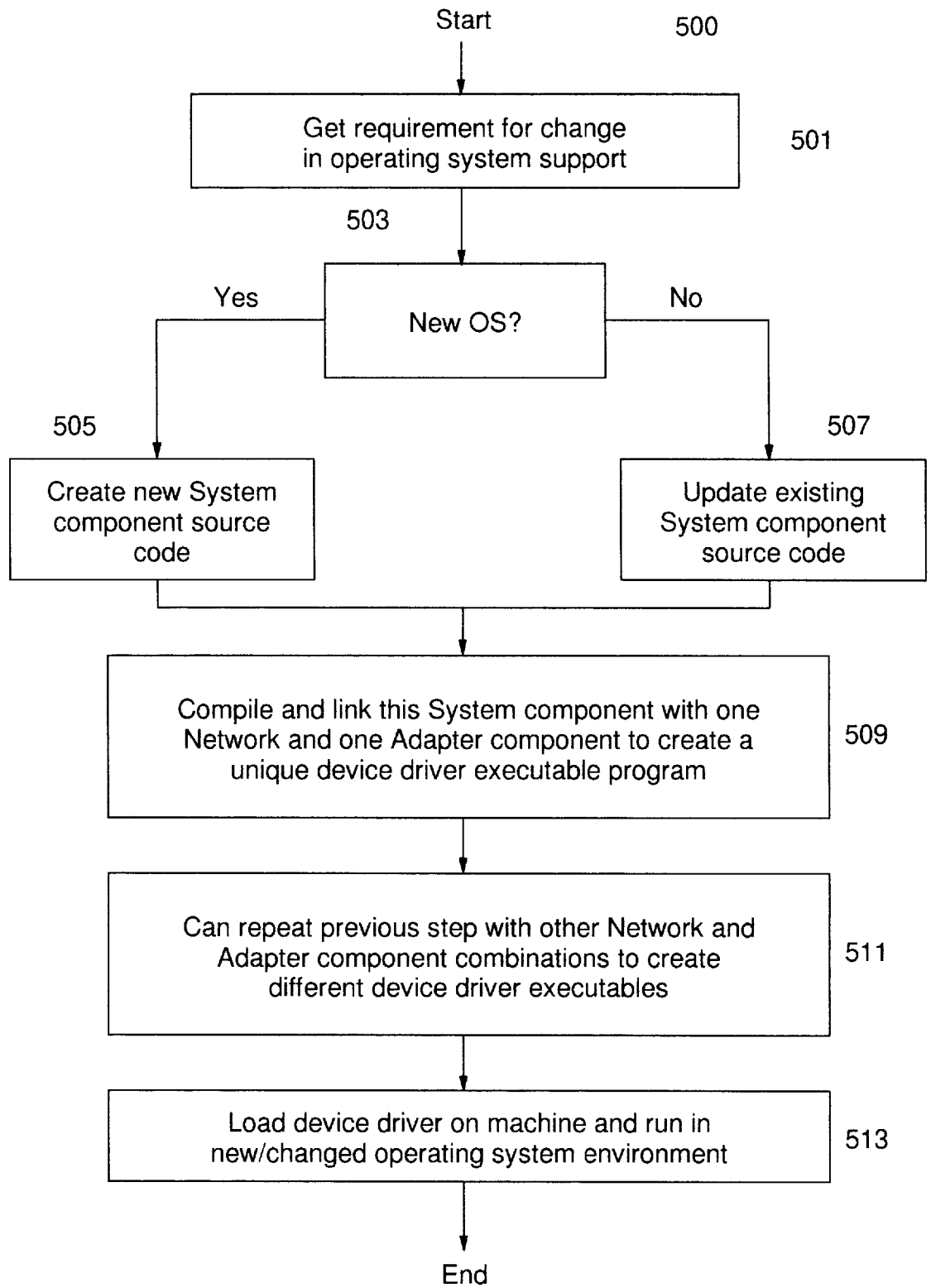
FIG. 6 is a flow diagram for modifying a System component in the device driver of FIG. 1 for handling an operating system change.

In FIG. 6, a design process 500 for changing a device driver to support a new or revised operating system. Essentially, the process 500 is similar to the process 400. The process 500 is entered in a step 501 in which the designer obtains the requirements for the new operating system. A step 503 determines if the operating system is new. A "yes" condition initiates a step 505 in which the designer creates the files, data structures, and code, as required, for the new System component. A "no" condition initiates a step 507 in which the designer updates the existing System component source code to conform to specifications. Again, in steps 505 and 507, the designer defines the files, data structures and code, as required, to enable the new or improved System component to perform the primitives provided to the other components. A step 509 responds to step 505 and 507 to compile and link the System component with one Network and one Adapter component to create a unique device driver executable program. A step 511 is performed by the designer to create different device driver executable files for other Network and Adapter component combinations with this System component. A step 513 loads the new or revised device driver in memory to run in the new or changed operating system environment, after which the design process ends.

Figure 7:
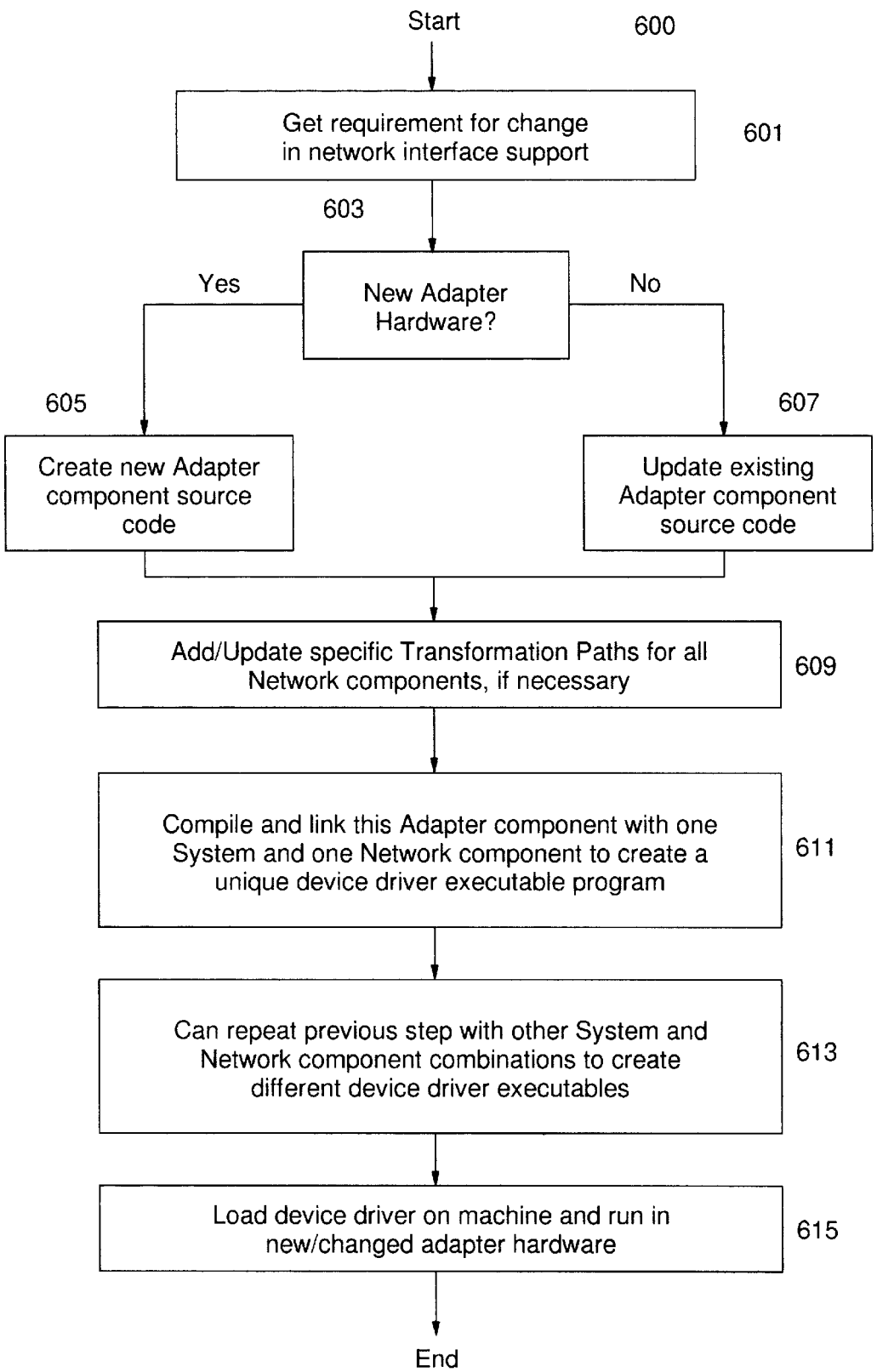
FIG. 7 is a flow diagram for modifying an Adapter component in the device driver of FIG. 1 to handle an adapter hardware change.

In FIG. 7, a design process 600 is disclosed for changing the Adapter component to handle a new or revised adapter hardware unit. Essentially, the steps in FIG. 6 are similar to the steps performed in FIGS. 5 and 6. In a step 601, a designer obtains the requirements to change the device driver to handle new or revised adapter hardware. A step 603 determines if the requirement is for new adapter hardware. A "yes" condition initiates a step 605 in which the designer creates the files, data structures and code, as required, for the new Adapter component to perform the primitives provided to the other components. A "no" condition initiates a step 607 in which the designer updates the existing Adapter component source code to conform to specifications. A step 609 responds to step 605 or 607 to add or update a Transformation Path for all Network components, if necessary. A step 611 creates a unique device driver executable program by compiling and linking the Adapter component with one System and one Network component. A step 613 is performed by the designer to create different device driver executable files for other System and Network component combinations with this Adapter component. A step 615 loads the new or updated device driver in memory to run with the new or changed adapter hardware, after which the design process ends.

It should be apparent to those skilled in the art that while the invention has been described with respect to a specific embodiment, various changes may be made therein, without departing from the spirit and scope of the invention as described in the specification and defined in the claims, in which:

We claim:

1. A design methodology for a device driver supporting a wide variety of system platforms and operating system; network protocols and adapter hardware, comprising the steps of:

forming a System, Network and Adapter component in the device driver;

defining a set of services for each component whereby such services can be used by the other components;

defining a program interface between each one of the components;

defining the public data supported by each component;

forming a Transformation Path in the adapter component for mapping network and adapter hardware descriptors in data processing operations; and creating or updating component source code to form new device driver executable code to support a new operating system or network protocol or adapter hardware.

2. In a data processing system including a processor and a memory coupled to a network through an adapter device, a device driver for supporting various processor operating systems, network protocols and adapter device interfaces, comprising:

a System component, a Network component and an Adapter component included in the device driver stored in the memory as program instructions;

each component coupled to the other component through an associated program interface;

each component providing functions and services to the other component as defined by the device driver in transferring data between the adapter device and the network; and means for altering or replacing a component in the device driver to support an unsupported operating system or network protocol or adapter hardware interface.

3. The data processing system of claim 2 further including a Transformation Path in the Adapter component for mapping network packet descriptors against adapter packet descriptors in data transferring processes directed by the device driver.

4. The data processing system of claim 2 wherein various adapter devices may be substituted for one another and the System component further comprises:

means for allocating storage data in the memory for each adapter device controlled by the device driver; and means for coordinating interrupt management for each adapter device controlled by the device driver.

5. The data processing system of claim 2 wherein the Network component further comprises:

means for interacting with a network operating system or protocol stack in the network;

means for managing interfaces with the network and ensuring their applicability and correctness to the operation of the device driver; and means for parsing each network configuration information and reporting errors to the protocol stacks.

6. The data processing system of claim 2 wherein the Adapter component further comprises:

means for managing all interactions between the adapter device and the network;

means for setting up, controlling and reporting operations of the adapter device; and means for providing a common method of interacting between the various device drivers and adapter devices.

7. The data processing system of claim 2 further comprising:

internal application programming interface between each component and defining a set of services each component is obligated to provide to the other component; and a set of primitives for each component for implementing the services provided by one component to another component.

8. In a data processing system including a processor and a memory coupled to a network through an adapter device, a method for supporting a device driver in interfacing with various processor operating systems, network protocols and adapter device interfaces, comprising the steps of:

storing a System component, a Network component and an Adapter component as program instructions in the memory as the device driver;

coupling each component to the other component through an associated program interface;

providing functions and services from each component to the other component as defined by the device driver in transferring data between the adapter device and the network; and altering or replacing a component in the device driver to support an unsupported operating system or network protocol or adapter hardware interface.

9. The method of claim 8 further comprising the step of:

installing a Transformation Path in the Adapter component for mapping network packet descriptors against adapter packet descriptors in data transferring processes directed by the device driver.

10. An article of manufacture, comprising:

a computer useable medium having computer readable program code means embodied therein for supporting a device driver in interfacing with various processor operating systems, network protocols and adapter device interfaces in a data processing system including a processor and a memory coupled to a network through an adapter device, the computer readable program code means in said article of manufacture, comprising:

computer readable program code means for storing a System component, a Network component and an Adapter component as program instructions in the memory as the device driver;

computer readable program code means for coupling each component to the other component through an associated program interface;

computer readable program code means for providing functions and services from each component to the other component as defined by the device driver in transferring data between the adapter device and the network; and computer readable program code means for altering or replacing a component in the device driver to support an unsupported operating system or network protocol or adapter hardware interface.

11. The article of manufacture of claim 10 further including computer readable code means for installing a Transformation Path in the Adapter component for mapping network packet descriptors against adapter packet descriptors in data transferring processes directed by the device driver.

* * * * *